June 21, 1949.　　　A. B. WHITE　　　2,473,928
ARC WELDING SYSTEM
Filed Nov. 30, 1946
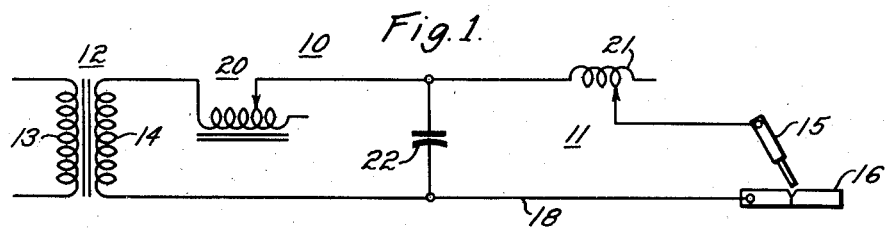
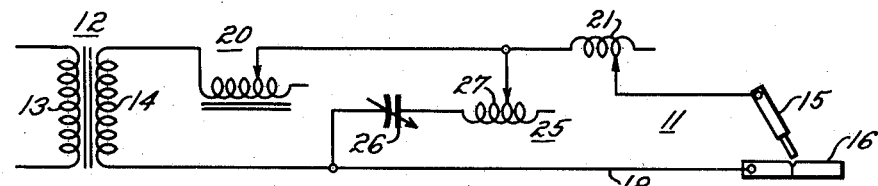
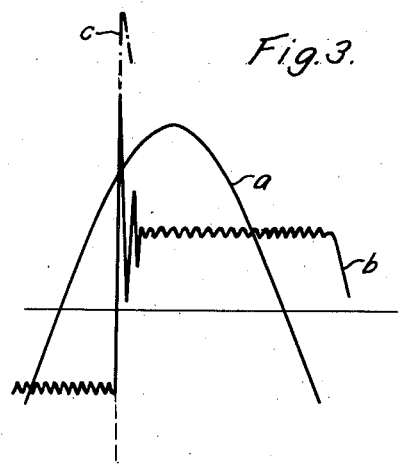
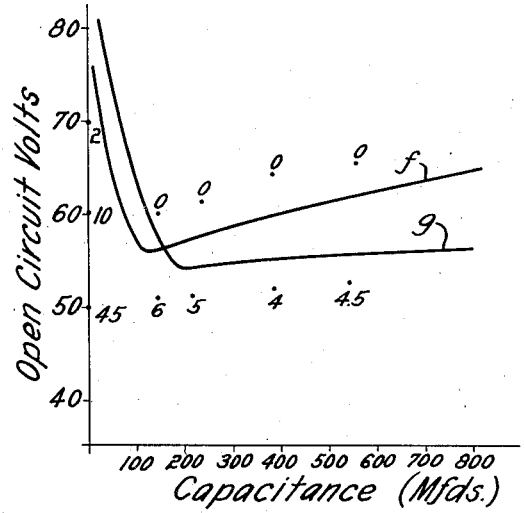
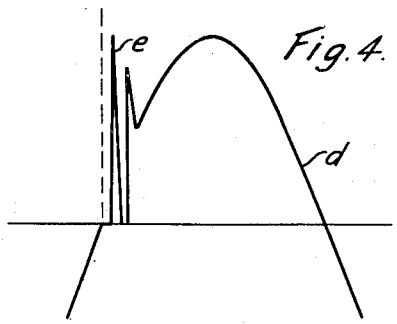
INVENTOR
Alfred B. White.
BY
ATTORNEY Patented June 21, 1949

2,473,928

UNITED STATES PATENT OFFICE 2,473,928

ARC WELDING SYSTEM

Alfred B. White, Murrysville, Pa., assignor to Westinghouse Electric Corporation, East Pittsburgh, Pa., a corporation of Pennsylvania Application November 30, 1946, Serial No. 713,237

6 Claims. (Cl. 315—276)

My invention relates, generally, to arc-welding systems, and it has reference, in particular, to the stabilization of arcs in alternating-current, arc-welding systems.

Generally stated, it is an object of my invention to provide an improved arc-welding system which is simple and inexpensive to manufacture, and which is easy to operate.

A more specific object of my invention is to provide for utilizing a capacitor in an alternating-current, arc-welding system to stabilize the arc.

More specifically, it is an object of my invention to provide for efficiently stabilizing the arc of an alternating-current, arc-welding circuit by utilizing a shunt capacitor to supply sufficient electrical energy to the circuit between successive half cycles of the source current wave.

Another object of my invention is to provide for using an optimum value of shunt capacitance in an alternating-current, arc-welding circuit to stabilize the arc without appreciably increasing the open circuit voltage.

Yet another object of my invention is to provide, in an alternating-current, arc-welding system, for affording greater safety to an operator by using a lower value of open circuit voltage, and connecting a shunt capacitor in the welding circuit for improving the stability of the arc at the lower value of open circuit voltage.

It is an important object of my invention to provide for using a capacitor in shunt circuit relation with the arc in an arc-welding circut, the capacitor being of such a value that it reduces the number of arc outages during a given period to a satisfactorily low value.

A further object of my invention is to provide for using in an alternating-current, arc-welding circuit a shunt capacitor which stores sufficient electrical energy and, at the same time, has a sufficiently short charging time to efficiently restrike and stabilize an arc between successive half cycles of the source frequency.

Other objects will, in part, be obvious, and will, in part, be explained hereinafter.

In practicing my invention in one of its forms, a capacitor of from 100 to 250 microfarads capacity is connected in shunt circuit relation with the arc in the secondary circuit of a transformer-type welder which is energized from a 60-cycle alternating-current source. With an open circuit voltage in the secondary circuit on the order of 55 to 65 volts, an extremely stable arc may be readily maintained by an operator because of the relatively high-breakdown voltage produced by reason of oscillatory charging of the capacitor, and the energy supplied to the arc by the capacitor upon breakdown of the gap between the electrode and work each time that the arc is extinguished between successive half cycles of the source frequency.

For a more complete understanding of the nature and scope of my invention, reference may be made to the following detailed description which may be read in connection with the accompanying drawing, in which:

Figure 1 is a diagrammatic view of an alternating-current, arc-welding system embodying the invention in one of its forms;

Fig. 2 is a diagrammatic view of an alternating-current, arc-welding system embodying the invention in a different form;

Fig. 3 shows voltage curves of an arc-welding system embodying the invention;

Fig. 4 shows the resultant current curve in an arc-welding system embodying the invention, and Fig. 5 shows boundary curves designating threshold between satisfactory and unsatisfactory welding conditions for different values of open circuit voltage and capacitance.

Referring to Figure 1, the reference numeral 10 may denote, generally, an alternating-current, arc-welding system wherein translating apparatus, such as a welding transformer 12, may be utilized, having a primary winding 13 disposed to be connected to a suitable source of alternating-current and a secondary winding 14 disposed to be connected to supply electrical energy to an arc-welding circuit 11, including an arc-welding electrode 15 and work 16 upon which a welding operation is to be performed. One terminal of the secondary winding 14 may be connected to the work 16 by a conductor 18, while the other terminal may be connected to the welding electrode 15 through a current-limiting reactor 20 which may be adjustable so as to obtain different predetermined values of welding current. The numeral 21 may designate a reactance device which may be employed to control the discharge, where very short leads are used, though in the usual case it may be omitted since the welding leads normally provide sufficient inductive reactance themselves.

In order to provide for stabilizing the arc between the electrode 15 and the work 16, a capacitor 22 may be connected in shunt circuit relation with the arc-welding circuit 11 intermediate the current reactor 20 and the arc. The capacity of the capacitor 22 may be so proportioned as to provide a charging circuit for the capacitor, including the reactor 20 and the secondary winding 14 of the welding transformer 12 which is resonant at a sufficiently high frequency that the arc does not have time to deionize as described below. Under these conditions, the voltage across the capacitor 22 may reach a value approximately twice the instantaneous voltage impressed on the capacitor by the transformer 12, where the arc ceases to conduct at the end of a half cycle of arc-current flow.

Referring to Fig. 2, the reference numeral 12 may, as hereinbefore, designate a welding transformer having a primary winding 13 which may be connected to a suitable source, such as the usual 60-cycle alternating-current power system, and a secondary winding 14 for supplying welding current to an arc-welding circuit 11 including an arc-welding electrode 15 and work 16 upon which a welding operation is to be performed. A current limiting reactor 20 may be connected in series circuit relation with the secondary winding 14 and the arc-welding circuit.

In order to improve the stability of the arc between the electrode 15 and the work 16, a shunt stabilizing circuit 25 may be connected in shunt circuit relation with the arc-welding circuit 11, intermediate the current-limiting reactor 20 and the arc. The stabilizing circuit may, for example, comprise a capacitor 26 and a reactance device 27. By providing the reactance device 27 in the shunt stabilizing circuit, the discharge frequency of the capacitor 26 may be suitably varied to obtain the maximum benefits without affecting the impedance of the welding circuit to the normal flow of welding current.

In order to best describe the operations of the welding systems of Figs. 1 and 2, reference may be made to Figs. 3 and 4. In Fig. 3, the substantially sine wave curve $a$ designates the secondary voltage of the welding transformer 12. The curve $b$ designates the arc voltage. The curve $c$ designates the capacitor voltage under open circuit conditions. The curve $d$ of Fig. 4 designates the arc current.

Under normal welding conditions the arc voltage will be substantially constant during each half cycle, though with minor fluctuation as represented by the substantially horizontal but rippled portion of the curve $b$. Should the arc be momentarily extinguished during the transition period from the negative half cycle to the positive half cycle of the source frequency, the arc current will remain momentarily at zero value, as represented by the horizontal portion of the curve $d$ along the reference line. The reactive voltage drop in the reactances 20 disappears, and the circuits consisting of the inductive reactances 20 and the capacitors 22 and 26 of Figs. 1 and 2 are immediately subjected to the full open circuit voltages of the transformers 12. Since the charging conditions are oscillating, the voltages of the capacitors 22 and 26 will rise relatively abruptly to peak values on the order of twice the voltages of the secondary windings 14. With an instantaneous value of open circuit voltage on the order of 55 to 65 volts, for example, this means that the condenser voltages may reach the values of the order of 110 to 130 volts if the arcs are not reestablished.

Since the ionization in the region of the arc dies out rapidly during the period immediately subsequent the extinction of the arc, it will be seen that not only is it necessary to use a capacitor sufficiently large to be able to supply sufficient electrical energy to reestablish the arc and maintain it until the welding transformer 12 is able to supply arc current, but it is also important to utilize a capacitor which is sufficiently small so that the charging time is not too appreciable a portion of a half cycle of the source frequency, so that the capacitor will be charged and available for discharge while the arc gap remains sufficiently ionized.

Thus with a capacitor having a sufficiently short charging period, the voltage of the capacitor may rise to the 100-volt point, for example, sufficiently quickly to reestablish the arc while the arc zone is still appreciably ionized. The capacitor then discharges into the arc as shown by the peak $e$ of the current wave in Fig. 4. Even though the arc current may momentarily reach a zero value on the subsequent negative discharge peak, the stored energy of the capacitor is sufficient that the ionization of the arc space is increased, and the arc is readily restruck again. By the time that the oscillatory discharge of the capacitor has died to a relatively low value, the arc current will have built up to a relatively high value since the welding transformer 12 will then be able to supply welding current in its normal manner to maintain the arc throughout the remainder of the half cycle. This procedure will be repeated each time the arc is extinguished during the transition from one-half cycle to the succeeding half cycle.

It has been found that with transformer welders of the usual type having, for example, a secondary winding of 16 turns with an open circuit voltage on the order of 65 volts and a current-limiting reactor 20 with about 37 turns and a variable reactance of from .11 to 1.0 ohms, a capacitor on the order of 50 to 250-microfarad capacity will be highly satisfactory. In practice, a capacitor of about 120 microfarads produces the most beneficial results when used in a 60-cycle alternating-current arc-welding system.

The stability of the arc is not merely a direct function of the size of the capacitor. While the electrical energy stored in a capacitor is a direct function of the capacity thereof, the charging time of the capacitor is also an important factor, and it increases in proportion to the square root of the capacitance, since $t=\pi\sqrt{LC/4}$. During the charging period, the arc space continues to become more and more deionized. Accordingly, with larger values of capacitors, the charging period may become so long that the arc gap becomes very much deionized, whereupon the peak charging voltage of the capacitor is insufficient to break down the arc space and discharge so as to restrike the arc. Furthermore, the discharge current of a capacitor increases as the square root of the capacitance, and excessive surge currents from relatively large capacitors cause splattering of the molten metal in the weld crater, which is highly undesirable. In addition, with increasing values of capacitance the open circuit voltage of the welding circuit increases. Accordingly, the larger values of capacitors are not only impractical because of increased cost and too much splatter, but they also tend to neutralize the increased safety which can be obtained by using lower open circuit voltages with smaller values of shunt capacitors.

The energy stored in a capacitor may be determined from the relationship $w=CE^2/2$, where $w$ is watt-seconds, $C$ is the capacitance and $E$ is the voltage of the capacitor. Thus with a 200-microfarad capacitor, the energy stored therein will be of the order of 1 watt-second when the arc space breaks down at, say, 100 volts. Since the discharge current may be determined by the relationship $I=E\sqrt{C/L}$, where I is the discharge current, E is the voltage of the capacitor, C is the capacitance and L is the inductance of the discharge circuit, the discharge current produced by a 200-microfarad condenser will be on the order of 205 amperes peak value. (This is based on an average lead reactance of 26 microhenries, a breakdown voltage of 100 volts and an arc voltage of 25 volts which acts as a counterelectromotive force during the discharge.) The charging period for a 200-microfarad condenser will be somewhat less than ¼ cycle of the charging frequency so that the charging period $t<2\pi\sqrt{LC/4}$, which gives a value on the order of $.34\times10^{-3}$ seconds. The charging frequency under these conditions will be on the order of 830 cycles per second and may vary from about 600 to 1000 cycles per second with satisfactory results.

From these figures, it will be seen that the energy, current and charging times are appreciable fractions of the average welding conditions in a 60-cycle system. The peak-discharge current is on the order of 1½ times the peak-welding current, while the charging time of the capacitor is on the order of 4% of ½ cycle of the 60-cycle source.

The curve $f$ of Fig. 5 represents the threshold or boundary between satisfactory and unsatisfactory welding conditions for different values of capacitance and different open circuit voltages, with coated electrodes of the type used for downhand welding and conforming to the A. W. S. tentative classifications E-6020 and E-6030. For example, with no capacitance 2 outages occurred when welding with a predetermined number of such electrodes at open circuit voltages of 70 volts, while 45 outages occurred in welding without any capacitance and at an open circuit voltage of 50 volts. The numbers of outages occurring for different given values of open circuit voltage and capacitance are designated by the numerals adjacent the curve $f$ and on opposite sides thereof. Thus with an open circuit voltage of approximately 51 volts and a capacitance of 120 microfarads, 6 arc outages occurred in welding with five successive electrodes. With the open circuit voltage raised to 61 volts, no outages resulted. Similar runs were made with capacitances of approximately 240, 380 and 470 microfarads. The curve $f$ represents the median between all of these conditions. For an open circuit voltage on the order of 55 to 65 volts, it will be observed that a capacitor having a capacitance of from approximately 50 to 250 microfarads provides completely satisfactory welding conditions. The curve $f$ represents the results obtained in a 60-cycle arc-welding system when using welding leads having the length of 100 feet or so with 60-cycle impedance on the order of 0.065 ohm. The curve $g$ represents the boundary line between satisfactory and unsatisfactory welding conditions based on the number of arc outages when using relatively short leads having a low value of reactance.

From the above description and the accompanying drawing, it will be apparent that I have provided for stabilizing the arc in alternating-current, arc-welding systems in a simple and effective manner. While capacitors have been used heretofore in shunt circuit relation with the arc for bypassing high-frequency, arc-stabilizing voltages, and for producing high-frequency voltages, I have departed from the practice of the prior art and have determined that the stability of the arc is not a direct function of the size of the capacitor. I have furthermore shown that a capacitor on the order of 50 to 250 microfarads is the most efficient from the point of reducing the number of arc outages and preserving the safety of a low open circuit voltage, and at the same time keeping the cost of the equipment within reasonable bounds. While capacitors on the order of 10 microfarads or so have been previously proposed, the energy available in such a capacitor would only be ¼ of 1% of the average energy for a ½ cycle of the welding current when welding at, say, 105 amperes. The discharge current from such a capacitor, being proportional to the square root of the capacitance, would be less than 50 amperes peak value, which is insufficient to maintain a stable arc with a ⅛-inch electrode even with direct-current power.

From Fig. 5, it will be seen that a capacitor of 10 microfarads capacity is entirely insufficient to maintain a reasonably stable arc, until the open circuit voltage is raised to approximately 75 volts. Such a voltage is generally considered to be dangerously high from the point of the operator's safety, and is, therefore, undesirable. By using a capacitor on the order of 50 to 200 microfarads capacity, the open circuit voltage may be reduced to 60 volts or lower, thus providing added protection for the operator while, at the same time, stabilizing the arc and making it easy to weld at the lower value of open circuit voltage.

Since certain changes may be made from the above-described construction, and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In an alternating-current arc-welding system, a welding transformer having a primary winding for connection to a 60-cycle source of electrical energy and a secondary winding for connection to an arc-welding circuit, a reactance device connected in series circuit relation with the secondary winding and the arc, and a capacitor of from 75 to 250 microfarads connected in shunt circuit relation with the secondary winding intermediate the reactance device and the source for maintaining a substantially continuous arc with an open circuit secondary voltage on the order of 55 to 65 volts.

2. In an alternating-current arc-welding system, a welding transformer having a primary winding energized from a 60-cycle source of alternating-current electrical energy and a secondary winding having an open circuit voltage on the order of 55 to 65 volts, circuit means including a current-limiting reactor connecting the secondary winding to a substantially continuous arc-welding circuit, and a capacitor connected in shunt circuit relation with the arc-welding circuit of sufficient capacity to supply on the order of one watt-second of electrical energy to the arc-welding circuit between half cycles of the source frequency for maintaining the arc.

3. In an alternating-current arc-welding system, a transformer having a primary winding and a secondary winding arranged to apply on the order of 60 volts open circuit to a substantially continuous arc-welding circuit, inductance means connected in circuit relation with the secondary winding and the arc-welding circuit, and a capacitor connected in shunt circuit relation with the arc of sufficient capacity to produce a peak-discharge current on the order of 200 amperes for restriking the arc whenever the arc is momentarily extinguished between half cycles.

4. In combination with a welding transformer having a primary winding for connection to a 60-cycle source of alternating-current electrical energy and a secondary winding for applying on the order of 55 to 65 volts to a substantially continuous arc-welding circuit, reactance means connected in circuit relation with the secondary winding and the arc circuit, and a capacitor connected in shunt circuit relation with the arc having a peak-discharge current on the order of 200 amperes and a charging time on the order of 4% of one-half cycle of the 60-cycle wave.

5. In an arc-welding system, the combination with a transformer having a primary winding for connection to a 60-cycle source of electrical energy and having a secondary winding, of circuit means including a reactance device connecting an arc-welding circuit to the secondary winding, and a capacitor on the order of 80 microfarads capacity connected in shunt circuit relation with the arc to provide for stabilizing the arc and reducing the number of arc outages to a minimum with an open circuit voltage of from 55 to 65 volts.

6. In an arc-welding system, the combination with a transformer having a primary winding for connection to a 60-cycle source of alternating current and a secondary winding for applying from 55 to 65 volts open circuit voltage to an arc-welding circuit including work and an electrode disposed to be maintained in arcing relation, of adjustable reactance means connected in circuit relation with the secondary winding and the arc-welding circuit to limit the welding current to different predetermined values, and a capacitor connected in shunt circuit relation with the arc between the reactance means and the arc to stabilize and maintain a substantially continuous arc, said capacitor having sufficient capacity to provide a charging circuit having a natural frequency on the order of 600 to 1000 cycles per second and to store approximately one watt-second of electrical energy for keeping the arc alive in the event it should be extinguished while the electrode remains in arcing position.

ALFRED B. WHITE.

REFERENCES CITED

The following references are of record in the file of this patent:

UNITED STATES PATENTS

| Number | Name | Date |
| --- | --- | --- |
| 1,416,007 | Eschholz | May 16, 1922 |
| 2,085,242 | Weaver | June 29, 1937 |
| 2,197,254 | Hunter | Apr. 16, 1940 |
| 2,322,709 | Owen | June 22, 1943 |